United States Patent Office 3,396,153
Patented Aug. 6, 1968

3,396,153
SULFO-N-ALKYLPROPIONAMIDE SALTS AS EMULSIFYING AGENTS IN POLYMERIZATION OF UNSATURATED COMPOUNDS
Emil Alfred Vitalis, Stamford, and Ralph Joseph Chamberlain, Glenbrook, Conn., assignors to American Cyanamid Company, Stamford, Conn., a corporation of Maine
No Drawing. Filed Nov. 5, 1963, Ser. No. 321,449
13 Claims. (Cl. 260—80.7)

This invention relates to the production of polymers and more particularly to a new and improved method of polymerizing unsaturated organic compounds. Even more particularly, this invention relates to a novel process for polymerizing ethylenically unsaturated organic compounds in an aqueous medium.

Numerous methods are well known for accomplishing the polymerization of unsaturated organic compounds. However, control of polymerization is frequently difficult because it is often accompanied by considerable development of heat. Since temperature affects the rate or degree of polymerization, efforts have been made to regulate the polymerization in order to obtain a fully polymerized product in suitable form. Emulsion and suspension polymerization, particularly in an aqueous medium, have the advantage of permitting a more effective regulation of polymerization since the heat evolved during the polymerization reaction or applied to the reaction medium may be more readily dissipated or distributed.

In carrying out an emulsion or suspension polymerization process, a polymerizable monomer or a mixture of polymerizable monomers is combined with a mixture of water, emulsifying agent, dispersing agent, polymerization catalyst, stabilizer, plasticizer, chain stopping agent, etc., all of which are maintained in the desired ratio, and the resulting mixture subjected to elevated temperatures to complete polymerization. The polymer formed in the aqueous emulsion as a latex may be used as such or it may be separated from the reaction mixture or medium by any suitable means such as coagulation with any suitable solvent, freezing, and the like. The polymer formed in aqueous suspension may be separated by filtration, centrifugation, and the like. In addition to the emulsifying agent serving the function of either forming a stable latex or acting to suspend the polymer, the emulsifying agent should not detract from the properties of the resulting polymer. Since the emulsifying agent is retained in the polymer latex and, in certain instances, in the coagulated or separated polymer, the importance of the emulsifying agent forming a stable latex and of not interfering with the heat and light stability and water sensitivity of the polymer recovered and of a film made from such a latex becomes readily apparent.

Numerous emulsifying agents for use in emulsion and suspension polymerizations are well known. However, many of such emulsifying agents are not effective for the production of stable polymer emulsions containing therein no or trace amounts of coagulum. Moreover, polymers prepared by emulsion and suspension polymerization techniques using certain other emulsifying agents do not possess desired physical properties such as, for example, heat and mechanical stability and clarity. In addition, films prepared from polymer emulsions employing certain other emulsifying agents for the preparation thereof display a marked sensitivity toward water.

We have now discovered novel emulsifying agents eminently suitable for use in emulsion and suspension polymerization of ethylenically unsaturated organic compounds. Said emulsifying agents are defined as alkali metal sulfo-N-alkylpropionamides prepared by sulfonating an N-alkylacrylamide produced by the Ritter reaction.

The alkali metal sulfo-N-alkylpropionamides employed in the process of this invention are readily obtained by reacting a branch chain acrylamide Ritter reaction product (wherein the alkyl group prior to the Ritter reaction is predominantly straight chain and is characterized by having at least 10 carbon atoms) and an alkali metal sulfite or bisulfite, preferably in the presence of a polymerization inhibitor, said reaction being carried out in a solvent at temperatures of from about 40° C. to about 120° C.

The branch chain acrylamides which are sulfonated as described above are prepared employing the procedure disclosed in the Ritter patent, No. 2,573,673, that is, by reacting a suitable α-unsaturated nitrile, such as acrylonitrile, and a suitable olefin in the presence of a cationoid substance, such as strong sulfuric acid, and by hydrolyzing the resultant intermediate reaction product.

The alkali metal sulfo-N-alkylpropionamides which are employed in the process of this invention are also more fully described and claimed in Emil A. Vitalis, Michael J. D'Errico and Winfried J. Fremuth copending application Ser. No. 274,342, filed Apr. 19, 1963, now Patent No. 3,317,589.

The alkali metal sulfo-N-alkylpropionamides which contain branch chain alkyl groups and/or isomeric alkyl groups may contain minor amounts of alkali metal branch chain alkyl sulfates or sulfonates which are characterized by the alkyl group therein being the same as the alkyl groups in the propionamides. However, the presence of alkali metal branch chain alkyl sulfate or sulfonate does not appear to adversely affect the emulsifying properties of the alkali metal sulfo-N-alkylpropionamides. Because of this, the alkali metal branch chain alkyl sulfates or sulfonates which may be formed during the preparation of the branch chain acrylamides need not be separated from the branch chain acrylamides prior to sulfonation of the same. If not so separated from the acrylamides, the alkali metal branch chain alkyl sulfates or sulfonates usually and preferably are present in the final product in minor amounts, that is, about less than 50% by weight. Compositions in which the alkyl group of both the branch chain alkyl propionamides and the branch chain alkyl sulfates or sulfonates is derived from long, straight chain olefins containing from 10 to 20 carbon atoms are preferred.

During the preparation of the alkali metal sulfo-N-alkylpropionamides, alkali metal sulfates are also produced. While the presence of such inorganic salts does not appear to adversely affect the emulsifying properties of the alkali metal sulfo-N-alkylpropionamides if admixed therewith, it is generally desirable to separate such salts therefrom. In certain instances, they may be present with alkali metal sulfo-N-alkylpropionamides in minor amounts and yet not detract from the emulsifying action of such alkali metal sulfo-N-alkylpropionamides.

Suitable sulfo-N-alkylpropionamide salts which may be employed in the process of this invention include the sodium, potassium, lithium and ammonium salts. Of these, the sodium salt is preferred because of ease of preparation using sodium bisulfite or sodium sulfite in the sulfonation reaction with branch chain alkylacrylamide.

As pointed out hereinabove, the alkyl group in the alkali metal sulfo-N-alkylpropionamides may contain from 10 to 20 carbon atoms. Typical alkyl groups include, for example, methyl nonyl, methyl undecyl, methyl dodecyl, methyltridecyl, methylpentadecyl, methylheptadecyl and methyl nonadecyl as well as mixed alkyl groups, for example, $C_{11}$–$C_{15}$ and $C_{16}$–$C_{20}$. Those alkali metal alkylpropionamides containing $C_{11}$–$C_{15}$ and $C_{16}$–$C_{20}$ alkyl groups are obtained utilizing broad cuts of olefins available from the petroleum industry in the preparation of the intermediate alkylacrylamide.

The monomers to be polymerized or copolymerized by the process of this invention comprise the substantially water-soluble ethylenically unsaturated organic compounds. The expression "substantially water-insoluble" as used herein refers to those monomers which have at least some solubility in water so that some of the monomer may enter the aqueous medium but still have comparatively little solubility in water that they are regarded as being relatively water-insoluble. Preferably, the monomers have a solubility in water at room temperature of from 0.1 part to 30 parts per 100 parts of water. Particularly preferred monomers are those having a solubility of from 0.1 part to 15 parts per 100 parts by weight of water.

The expression "ethylenically unsaturated," as used throughout the specification and claims, refers to those monomers possessing one or more polmerizable ethylenic groups in their molecule. Examples of such monomers include maleic acid esters, butadiene-1,3, dimethyl-butadiene-1,3, isoprene, chloroprene, styrene, alpha-methyl styrene, dichlorostyrene; esters of unsaturated acids, such as methyl acrylate, propyl acrylate, butyl acrylate, hexyl acrylate, octyl acrylate, methyl methacrylate, and butyl methacrylate; the vinylidene halides such as vinylidene chloride and vinylidene bromide; the vinyl halides such as vinyl chloride and vinyl bromide; the unsaturated nitriles such as methacrylonitrile and acrylonitrile and the corresponding unsaturated acids such as methacrylic acid and acrylic acid; the vinyl esters of monocarboxylic acids such as vinyl acetate, vinyl caproate, vinyl chloroacetate, vinyl benzoate, and vinyl valerate; the vinyl esters of polycarboxylic acids such as divinyl succinate, divinyl adipate, vinyl allyl phthalate, diallyl phthalate; the vinyl esters of the unsaturated acids such as vinyl acrylate, vinyl crotonate, and vinyl methacrylate; the vinyl ethers such as vinyl ethyl ether, vinyl butyl ether; and vinyl ketones such as vinyl hexyl ketone, and vinyl octyl ketone.

Preferred monomers to be polymerized or interpolymerized by the process of this invention comprise the vinylidene monomers containing a polymerizable $$CH_2=C=$$

group and no other polymerizable group such as styrene, methyl styrene, butadiene, vinyl acetate, vinyl chloride, vinylidene chloride, vinyl butyrate, acrylonitrile, acrylic and methacrylic acid, and the lower alkyl esters thereof including methyl acrylate, ethyl acrylate, butyl acrylate, 2-ethylhexyl acrylate, methyl methacrylate, ethyl methacrylate, and the like.

Batch polymerization, where all the ingredients are present at the start, monomer addition, catalyst or reducer addition, or incremental addition of monomer especially in some instances where the catalyst system is changed (or added to) between increments to achieve special effects, may all be practiced employing the emulsifying agents of this invention. Uniformly reproducible latices having excellent mechanical and heat stability may be obtained using the emulsifying agents of this invention regardless of the particular minor modifications in emulsion polymerization techniques which may be resorted to. The emulsions formed are used extensively in paints, floor polishes, etc., and for coating paper, textiles and other substrates.

The amount of emulsifying agent used may vary over a wide range. Best results are obtained when an amount is present to afford a substantially stable emulsion or suspension of polymer. In general, concentrations of the emulsifying agent fall within the range of from about 0.01 to about 10% by weight based upon the monomer or monomers.

The aqueous medium in which polymerization is carried out employing the novel emulsifying agents of this invention may comprise a water-soluble organic solvent for the monomer or monomers diluted with water to a sufficient extent to constitute a non-solvent for the polymer. As the aqueous medium, aqueous solutions of methanol, ethanol, or isopropanol may be used while other solvents, diluted with water, for example, liquid water-soluble alcohols such as glycol and glycerol as well as water-soluble ketones such as methyl ethyl ketone may be similarly employed with advantage.

In order to illustrate the principal features of the present invention, the following non-limitative examples are given:

Example 1.—Preparation of sodium sulfo-N-$C_{11}$–$C_{15}$ alkylpropionamide

One part of $C_{11}$–$C_{15}$ predominantly straight chain olefin fraction and one part of acrylonitrile are heated to 70° C. and 1.4 parts of 96% sulfuric acid are added in the presence of nitrogen. The addition temperature is 40–60° C., and the mixture is heated for one hour at 80°–85° C. The Ritter reaction mixture is added to the sulfonation mixture which contains 0.9 part of sodium sulfite, 1.4 parts of 50% sodium hydroxide, trace of di-tert-butyl nitroxide, 550 g. of water and 50 ml. of isopropyl alcohol. The resulting mixture is refluxed for six hours in the presence of nitrogen.

The resulting mixture when spray dried yielded a light cream colored powder containing 54% sodium sulfo-N-$C_{11}$–$C_{15}$ alkylpropionamide, 6% $C_{11}$–$C_{15}$ alkyl sulfate and 40% inert materials, principally sodium sulfate.

Examples 2 and 3.—Preparation of terpolymer of acrylonitrile-butadiene-styrene and copolymer of butadiene-styrene

| Ingredients | Parts by Weight Charged to Kettle | |
|---|---|---|
| | Acrylonitrile-Butadiene-Styrene | Butadiene-Styrene |
| Acrylonitrile | 30 | |
| Butadiene | 30 | 35 |
| Styrene | 40 | 65 |
| Potassium persulfate | 0.5 | |
| Ammonium persulfate | | 0.3 |
| Dodecyl mercaptan | 0.5 | 2.0 |
| Sodium sulfo-N-$C_{11}$–$C_{15}$ alkylpropionamide (as prepared in Example 1) | 3.0 | 3.0 |
| Water | 150.0 | 100.0 |

PROCEDURE FOR ABOVE RECIPES

All components are weighed into glass polymerization bottles. The water is charged to the glass polymerization bottle followed by sodium sulfo-N-$C_{11}$–$C_{15}$ alkyl propionamide. The pH is adjusted using a suitable base, e.g., sodium hydroxide. The dodecyl mercaptan is then added, followed by the persulfate dissolved in a small portion of water. The styrene and acrylonitrile are added and then the butadiene is added in a slight excess; which excess is used to purge the bottle of oxygen. After sealing the bottles are tumbled for 18 hours at 50° C. The batch is then cooled. Since such latices are used for coating, the batch is filtered to assure complete freedom from dirt, polymer, particles, etc.

The procedure of Examples 2 and 3 is repeated in all essential respects in a series of other experiments except that the amount of sodium sulfo-N-$C_{11}$–$C_{15}$ alkylpropionamide is varied (Examples 11 and 12) and that other surface active agents and emulsifying agents are employed (Examples 4, 5, 6, 7, 8, 9 and 10). Data obtained on polymer yield and on the properties of the resultant latices and films are given in the following tables:

TABLE I.—PROPERTIES OF BUTADIENE-STYRENE-ACRYLONITRILE LATICES

| Ex. No. | Emulsifier Used | Concentration on Monomer, weight percent | Polymer Yield | | Properties of Latex | | | Particle Size (A.) | | Film Properties | | | |
|---|---|---|---|---|---|---|---|---|---|---|---|---|---|
| | | | Conversion, weight percent | Coagulum, weight percent | Color | pH | Viscosity Seconds Ford Cup #4 | Range | Peak | Appearance | Water Spotting | Immersion for 1 hr. | Rub Resistance |
| 2 | Sodium sulfo-N-C₁₁-C₁₅ alkyl propionamide. | 3 | 99+ | 0 | Blue-white. | 8.2 | 25 | 500-750 | 525-650 | Clear | None | 100 | Good. |
| 4 | Tetrasodium N-(1,2-dicarboxyethyl)-N-octadecylsulfosuccinate. | 3 | 98 | 0.3 | Light grey. | 7.2 | 25 | 275-1,000 | 450-700 | Slightly hazy. | ___do___ | 30 | Do. |
| 5 | Dihexyl sodium sulfosuccinate. | 3 | 99+ | 0.0 | White | 6.7 | 35 | 450-825 | 600-800 | Frosty | ___do___ | 100 | Fair. |
| 6 | {Tetrasodium N-(1,2-dicarboxyethyl)-N-octadecylsulfosuccinate. Dihexyl sodium sulfosuccinate.} | {1.5 1.5} | 99+ | 0.0 | {Light grey.} | 7.0 | 23 | 275-1,225 | 650-1,000 | Hazy | Slight | 0 | Good. |
| 7 | Diamyl sodium sulfosuccinate. | 3.0 | 98 | 1.0 | V. white | 6.0 | 25 | 450-1,175 | 725-1,050 | ___do___ | None | 95 | Fair. |
| 8 | N-Octadecyl disodium sulfosuccinate. | 3.0 | 99+ | 0.2 | Ivory | 6.6 | 29 | 350-1,000 | 550-825 | Frosty to opaque. | Spotted | 5 | Poor. |
| 9 | Di-2-ethyl-hexyl sodium sulfosuccinate. | 3.0 | | 10.0 | (³) | | | | | | | | |
| 10 | Ditridecyl sodium sulfosuccinate. | 3.0 | | Severe | (³) | | | | | | | | |

¹ 90% within this value.
² Percent of air-dried film adhering to glass after one hour immersion in water at 25° C.
³ Not determined.

TABLE II.—PROPERTIES OF BUTADIENE-STYRENE LATICES

| Ex. No. | Emulsifier Used | Concentration on Monomer, weight percent | Polymer Yield | | Properties of Latex | | | Particle Size (A.) | | Film Properties | | | |
|---|---|---|---|---|---|---|---|---|---|---|---|---|---|
| | | | Conversion, weight percent | Coagulum, weight percent | Color | pH | Viscosity Seconds Ford Cup #4 | Range | Peak | Appearance | Water Spotting | Immersion for 1 hr. | Rub Resistance |
| 3 | Sodium sulfo-N-C₁₁-C₁₅ alkylpropionamide. | 3 | 99+ | 0.0 | Blue-white. | 8.0 | 15 | 500-800 | 500-700 | Clear, hard. | None | 100 | Good. |
| 11 | ___do___ | 2 | 99+ | 0.1 | Blue-white. | 7.8 | 15 | 500-700 | 500-900 | ___do___ | ___do___ | 100 | Do. |

¹ 90% within this value.
² Percent of air-dried film adhering to glass after one hour immersion in water at 25°C.

From the results appearing in Table I, it will be readily apparent that percent coagulum, which value is a measure of stable, creamy, smooth latex obtained in the emulsion polymerization of butadiene-styrene-acrylonitrile, is 10% or higher when certain well known emulsifiers such as di-2-ethylhexyl sodium sulfosuccinate or ditridecyl sodium sulfosuccinate, are employed. (Examples 9 and 10.) It is evident that the large amount of coagulum formed precludes further testing of the latex or of the film. Moreover, the amount of coagulum produced when diamyl sodium sulfosuccinate (Example 7) is utilized is at an unacceptable level.

If the results of Examples 2, 4, 5, 6, and 8 are compared, it will be seen that trace amounts (0.0–0.3%) of coagulum are obtained. However, when the color of the latex prepared in each example is observed, it is evident that only the latex of Example 2 exhibits a blue-white color. Such a color or cast is an indication of a narrow distribution range of small size particles and this is borne out by an inspection of the particle size range and peak data.

When films are prepared from the latices (by making a draw-down on glass, paper or metal using a draw-knife), it is observed that only in the case of the latex prepared using sodium sulfo-N-C₁₁-C₁₅ alkylpropionamide (Example 2) is a clear film obtained which will not water spot and has good rub resistance. The films prepared from the latices of Examples 5 and 6 (during the preparation of which no coagulum was likewise obtained) manifest a frosty or hazy appearance making such latices less desirable in most applications. Fair rub resistance for the film from the latex of Example 5 and slight water spotting of the film from the latex of Example 6 are also noted. The films prepared from the latices where trace amounts of coagulum are produced are also observed to have a hazy or frosty appearance.

The adhesion of the film is also seen to be relatively poor for the latices of the films of Examples 4, 6, 7 and 8.

In summary, then, use of a typical novel emulsifying agent of this invention is markedly and surprisingly effective for the production of a butadiene-styrene-acrylonitrile latex with no coagulum, whose particle size range and peak are at a well defined optimum, and whose film is clear, resists water spotting and rubbing, and possesses good adhesion.

From the results appearing in Table II, it will be observed that in the preparation of a butadiene-styrene latex varied concentrations of sodium sulfo-N-C₁₁-C₁₅ alkylpropionamide may be utilized to produce a latex having only a trace amount of coagulum (0.0–0.1%) therein. The particle size range and peak of the latex are also optimum. Clear hard films which are resistant to spotting and to rubbing and non-sensitive to water upon immersion are further evidence of the unexpected improvements afforded by the use of a sodium sulfo-N-C₁₁-C₁₅ alkylpropionamide.

Examples 12, 13 and 14.—Preparation of copolymer of styrene and methacrylic acid; terpolymer of styrene, ethyl acrylate and methacrylic acid; and terpolymer of ethyl acrylate, methyl methacrylate and methacrylic acid

EMULSION POLYMERIZATION RECIPES

| | Parts by Weight | | |
|---|---|---|---|
| Ingredients | Styrene-Methacrylic Acid | Styrene-Ethyl Acrylate-Methacrylic Acid | Ethyl Acrylate-Methyl Methacrylate-Methacrylic Acid |
| Styrene | 98 | 80 | |
| Ethyl Acrylate | | 20 | 58 |
| Methyl Methacrylate | | | 40 |
| Methacrylic Acid | 2 | 2 | 2 |
| Sodium Persulfate | 0.3 | 0.3 | 0.3 |
| Sodium Bisulfite or Sodium Bicarbonate or mixtures | 0.2 | 0.2 | 0.2 |
| Sodium sulfo-N-$C_{11}$-$C_{15}$ alkylpropionamide | 3.0 | 3.0 | 3.0 |
| Water | 150.0 | 150.0 | 150.0 |

PROCEDURE

Two-thirds of the water is charged to the reaction vessel and agitation is started. Sodium sulfo-N-$C_{11}$-$C_{15}$ alkylpropionamide and sodium bisulfite or sodium bicarbonate are added. The contents are heated and the vessel is purged with nitrogen to remove oxygen from the system. Sodium persulfate is dissolved in the remaining one-third of water (50 parts). Approximately one-twentieth of the persulfate solution is then added to the contents of the vessel. Monomers and the catalyst solution are added slowly when the desired temperature is reached (50–75° C.). The monomer addition is continued over a period of 1–2 hours. Very slow purging with nitrogen is continued throughout the reaction. The rate of addition of catalyst solution is adjusted so that there will be approximately one-eighth of the persulfate solution remaining which is added slowly after all of the monomers have been added. Upon completion of all additions, nitrogen flow is maintained and stirring continued for an additional period of one to five hours. Data obtained on polymer yield and on properties of the resultant latices and films appear in the following table:

From the results appearing in Table III, it is seen that latices having only trace amounts of coagulum therein are obtained using sodium sulfo-N-$C_{11}$-$C_{15}$ alkylpropionamide. Desirable particle size ranges (350–750A.) are also produced. Films of the terpolymers of styrene/ethyl acrylate/methacrylic acid and ethyl acrylate/methyl methacrylate/methacrylic acid display excellent clarity, adhesion to glass and resistance to water spotting. Excellent rub stability and water tolerance of the film of ethyl acrylate/methyl methacrylate/methacrylic acid, as prepared and as formulated, are also noted.

Self-polishing floor waxes prepared from the styrene/methacrylic acid copolymer latex and the styrene/ethyl acrylate/methacrylic acid terpolymer latex possess good water tolerance.

Example 15.—Preparation of copolymer of ethyl acrylate/methyl methacrylate emulsion polymerization recipe

| Ingredients: | Parts by weight |
|---|---|
| Ethyl acrylate | 40 |
| Methyl methacrylate | 60 |
| Sodium sulfo-N-$C_{11}H_{21}$-$C_{15}H_{31}$-alkylpropionamide | 2 |
| Water | 100 |
| Ammonium persulfate | 0.2 |
| Sodium carbonate | 0.3 |

Polymerization is carried out by slowly dripping the mixed monomers and the persulfate in part of the water into the remainder of the water containing the emulsifying agent and the carbonate. Polymerization is carried out over a period of two hours with good agitation of the ingredients at 80–85° C. under a blanket of nitrogen.

Example 16

The procedure of Example 15 is repeated in all essential respects except that sodium nonyl phenoxy ethanol sulfate is substituted for sodium sulfo-N-$C_{11}$-$C_{15}$ alkylpropionamide.

TABLE III.—PROPERTIES OF STYRENE-METHACRYLIC ACID, STYRENE-ETHYL ACRYLATE-METHACRYLIC ACID AND METHYL METHACRYLATE-ETHYL ACRYLATE-METHACRYLIC ACID LATICES

| | Properties of Latex | | |
|---|---|---|---|
| Property Evaluated | Styrene-Methacrylic Acid | Styrene-Ethyl Acrylate-Methacrylic Acid | Ethyl Acrylate-Methyl Methacrylate-Methacrylic Acid |
| Appearance Latex | Blue-white | Blue-white | Blue-white. |
| Viscosity (Ford Cup #2) seconds | 26 | 26 | 23. |
| Conversion (Percent) | 99.7 | 99.8 | 99.8. |
| Coagulum (Percent) | 0.5 | 0.2 | 0.1. |
| Particle Size (A.) | 500–750 | 350–650 | 400–600. |
| Film Properties: | | | |
| 1. Appearance | No film | Clear film | Clear film. |
| 2. Rub Stability | Powders | Fair | Excellent. |
| 3. Adhesion to glass | None | Good | Good. |
| 4. Water Spotting | | None | None. |
| 5. Water Tolerance: | | | |
| a. As prepared | | Fair | Excellent, remains clear on immersion. |
| b. Formulated [1] | Good | Good | Excellent. |

[1] Formulated as a typical self-polishing floor wax as follows:

| Ingredients | Parts by Weight | Order of Mixing |
|---|---|---|
| Copolymer or terpolymer emulsion (15–25% solids) | 20–60 | 1 |
| Carnauba wax or polyethylene wax emulsion (approximately 10–15% solids) | 10–30 | 3 |
| Plasticizer, e.g., tricresyl phosphate | 0–2 | 5 |
| Shellac or alkyd resin emulsion | 10–20 | 4 |
| Water to make 100 total parts by weight | | 2 |

The results of the experiments described in Examples 15 and 16 are tabulated below:

PROCEDURE

| Emulsifier Used | Conversion, percent | Coagulum, percent | Dry Film Appearance |
|---|---|---|---|
| Sodium sulfo-N-C$_{11}$–C$_{15}$ alkylpropionamide. | 97.6 | 0.4 | Clear, colorless. |
| Sodium nonyl phenoxy ethanol sulfate. | 97.5 | 4.6 | Very hazy. |

It is thus evident that the use of sodium sulfo-N-C$_{11}$–C$_{15}$ alkyl propionamide is surprisingly effective in producing a latex containing only trace amounts (0.4%) of coagulum, about 9% of the amount of coagulum as that obtained when a commercially available emulsifier, sodium nonyl phenoxy ethanol sulfate, is employed. Moreover, the film produced from the latex of Example 15 is clear and colorless while that prepared from the latex of Example 16 is very hazy.

The alkali metal sulfo-N-alkylpropionamides are effective in obtaining high conversion levels in certain polymerization systems wherein other emulsifiers achieve low conversion levels. For example, only 50% conversion was obtained in a polymerization procedure for obtaining a polyvinyl acetate emulsion using di-2-ethylhexyl sodium sulfosuccinate while 95% conversion was realized in the same procedure using sodium sulfo-N-C$_{11}$–C$_{15}$ alkylpropionamide.

Example 17.—Preparation of polyvinyl chloride suspension polymerization recipe

Ingredients: Parts by weight
Water _____ 175.0
Sodium sulfo-N-C$_{11}$–C$_{15}$ alkyl propionamide __ 3.0
Potassium persulfate _____ 0.4
Water _____ 5.0
Sodium bisulfite _____ 0.2
Water _____ 10.0
Vinyl chloride _____ 100.0

PROCEDURE

One hundred and seventy-five parts of water are charged to a pressure reactor, agitation is started, and sodium sulfo-N-C$_{11}$–C$_{15}$ alkylpropionamide is added to the reactor. The vessel is purged with nitrogen. The persulfate solution is added to the reaction vessel. The sodium bisulfite solution is then added to the vessel. Purging with nitrogen is continued for about 15 minutes. The pressure reactor is sealed and heated to 40–50° C. Vinyl chloride is slowly injected under pressure while maintaining a temperature of 40–60° C. and a pressure no higher than 100 p.s.i. The pressure developed depends on the feed rate of vinyl chloride and the temperature. The polymerization is completed in eight hours.

In order to show the unexpected properties of the branch chain propionamides in effecting desirable polymerization reactions, a straight chain propionamide and a branch chain sulfate of comparable chain length were evaluated. The preparations are described below.

Example 18.—(A) 3-chloro-N-n-hexadecylpropionamide 1.0 mole of hexadecylamine (Armour, Armeen 16D recrystallized from hexane) and 1.0 mole of triethylamine are dissolved in 1 liter of toluene, and this solution is added to 1.0 mole of β-chloropropionyl chloride in 4 liters of toluene. The temperature of the reaction mixture is maintained between −10° to −5° C. during the addition. The mixture is allowed to warm to room temperature and then is heated to 85°–90° C. The hot mixture is filtered to remove the triethylamine hydrochloride, and the filtrate is cooled. The resulting mixture is filtered, and the solid is recrystallized from acetonitrile.

Analyses.—Theory: N, 4.22; Cl, 10.68. Found: N, 4.43; Cl, 10.46.

(B) N-n-hexadecylacrylamide

To 1.0 mole of hexadecylamine (Armour, Armeen 16D recrystallized from acetonitrile) and 1.0 mole of triethylamine (D.P.I., redistilled from KOH) dissolved in 2700 ml. of toluene is added 1.0 mole of acrylyl chloride in 75 ml. of toluene. The temperature of the reaction mixture is kept between −6° to 2° C. during the addition. The mixture is allowed to warm to 30° C. and is filtered to remove the triethylamine hydrochloride. The filtrate is passed through a column of chromatographic alumina, and the solvent is then removed. The solid is recrystallized from hexane and analyzed.

Analyses.—Theory: N, 4.74; iodine number 85.9. Found: N, 4.65; iodine number, 85.0.

(C) Sodium 3-sulfo-N-n-hexadecylpropionamide 1.0 mole of (A) or (B) and 1.0 mole of sodium sulfite are heated in 900 ml. of water and 900 ml. of isopropyl alcohol in the presence of hydroquinone. The mixture is heated under nitrogen at 80°–85° C. for 48 hours. The reaction mixture is filtered, cooled, and refiltered. The final solid residue is recrystallized from 95% ethanol and analyzed.

Analyses.—Theory: N, 3.51; S, 8.02. Found: N, 3.57; S, 7.97. Titration for anionic content, material too water insoluble to obtain titration.

Example 19.—(A) N-hexadecylacrylamide 1.0 mole of hexadecene-1 and 1.0 mole of acrylonitrile are heated to 70° C. and 1.4 moles of 98% sulfuric acid are added between 70°–80° C. The mixture is heated for 1 hour at 80°–85° C. and hydrolyzed by pouring onto ice water. The hydrolysis is completed by heating at 50° C. for ½ hour, and the mixture is made alkaline with 20% sodium hydroxide. The basic mixture is cooled to 10° C. and filtered. The filtrate is discarded, and the solid is heated with nitro-methane to separate the acrylamide from the alcohol. The recrystallized acrylamide has a M.P. of 72°–75° C.

Analyses.—Theory: N, 4.74; iodine number, 85.9. Found: N, 4.58; iodine number, 85.0.

(B) Sodium 3-sulfo-N-hexadecylpropionamide 1.0 mole of acrylamide and 1.0 mole of sodium sulfite are heated in 900 ml. of water and 900 ml. isopropyl alcohol in the presence of hydroquinone. The mixture is heated under nitrogen at 80°–85° C. for 24 hours. Two layers are present, and the bottom alkaline layer is removed and discarded. The organic material is cooled to room temperature, filtered and recrystallized from 95% ethanol.

Analyses.—Theory: N, 3.51; S, 8.02. Found: N, 3.39; S, 8.25. Titration for anionic content, 100%.

Example 20.—Sodium hexadecyl sulfate 1.5 moles of 98% H$_2$SO$_4$ are added to 1.0 mole of hexadecene-1 at 70°–75° C. The reaction mixture is diluted with about ⅓ its volume of ice water, and the lower acidic layer is discarded. The upper layer is extracted with pentane to remove any alcohol, olefin or dialkyl sulfate, and the pentane extract is discarded. The extracted material is neutralized with sodium hydroxide and dried. The solid is extracted with hot butanol. The butanol extract is evaporated to dryness, and the residue is recrystallized from 95% ethanol.

Analyses.—Theory: C, 55.78; H, 9.66; S, 9.30. Found: C, 55.76; H, 9.33; S, 9.23. Titration for anionic content, 100%.

TABLE IV.—PREPARATION OF COPOLYMER OF STYRENE-BUTADIENE (60/40)*

| Emulsifier | Concentration on Monomer (weight percent) | Remarks |
| --- | --- | --- |
| Pure sodium N-hexadecyl (straight chain) sulfopropionamide (Example 18) (C). | 3.0 | No reaction. |
| Pure sodium N-hexadecyl (branch chain) sulfopropionamide (Example 19) (B). | 3.0 | Conversion 94%+, no coagulum. |
| Pure sodium hexadecyl (branch chain) sulfate (Example 20). | 3.0 | No reaction. |
| Pure sodium N-hexadecyl (branch chain) propionamide (Example 19) (B), 4 parts. <br> Pure sodium hexadecyl (branch chain) sulfate (Example 20), 1 part. | 3.0 | Conversion 94%. |

* Procedure as in Example 3.

From the results appearing in the foregoing table, it is apparent that the excellent emulsion producing ability of the alkali metal sulfo-N-alkyl propionamides could not have been predicted from the behavior of known "similar" propionamides, i.e., those in which the alkyl portion thereof is straight chain. Thus, excellent conversion of styrene and butadiene are obtained and the latex contains no coagulum when sodium N-hexadecyl (branch chain) sulfo propionamide is used as contrasted with no reaction taking place when sodium N-hexadecyl (straight chain) sulfo propionamide is employed. Similarly, a branch chain alkyl sulfate, i.e., sodium hexadecyl (branch chain) sulfate, is ineffective for accomplishing polymerization. However, it should be noted that the presence of such a sulfate does not overly detract from the polymerization process when the same is admixed with a branch chain sulfo propionamide. Although such alkali metal branch chain alkyl sulfate may sometimes be obtained during the synthesis of the alkali metal sulfo N-alkyl propionamides, it need not be removed since the data above indicate that its presence may be tolerable.

The polymer may be easily recovered in virtually 100% yield from latices containing alkali metal sulfo N-alkylpropionamide by the addition of very small amounts of a coagulating agent such as aluminum sulfate. For example, the terpolymer of styrene-butadiene-acrylonitrile of Example 2 can be recovered as follows:

(1) Dilute one part emulsion to 20% solids or further if desirable depending on equipment used for handling precipitated polymer.

(2) If any additives are to be used with the polymer such as stabilizers, oils, lubricants, calcium stearate, etc., they may be added at this point.

(3) Dissolve 0.6 part of $Al_2(SO_4)_3 \cdot 18H_2O$ in six parts of water.

(4) Add the aluminum sulfate solution to the diluted and prepared latex. The polymer precipitates as a slurry which may be easily washed, filtered and dried. If oils are used, the polymer may be flushed directly into the oil phase using a surface active agent.

(5) The recovered polymer shows no evidence that the polymer properties are changed by the presence of sodium sulfo-N-$C_{11}$-$C_{15}$ alkylpropionamide.

Obviously, the other members of the class of alkali metal sulfo-N-alkylpropionamides, having 10 to 20 carbon atoms in the alkyl portion thereof and being branch chain, manifest similar properties to those displayed by those members (i.e., sodium sulfo-N-$C_{11}$-$C_{15}$ alkylpropionamide and sodium sulfo-N-$C_{16}$ alkylpropionamide) utilized in the examples.

While the foregoing invention has been described in conjunction with various preferred embodiments, it is to be understood that the invention is not to be solely limited thereto but is to be construed broadly and restricted only by the following appended claims.

We claim:

1. A process which comprises polymerizing ethylenically unsaturated substantially water insoluble compounds in an aqueous medium in the presence of an ammonium or alkali metal salt of sulfo-N-alkylpropionamide prepared by sulfonating an N-alkylacrylamide resulting from reacting an α-unsaturated nitrile and an olefin in the presence of a cationoid substance and thereafter hydrolyzing to said N-alkylacrylamide, wherein the alkyl group of said salt is branched chain and contains at least 10 carbon atoms.

2. The process of claim 1 wherein said salt is an alkali metal salt and said alkyl group contains 10 to 20 carbon atoms.

3. The process of claim 1 wherein said salt is the sodium salt.

4. The process of claim 1 wherein said ethylenically unsaturated compounds have water solubility at room temperature of 0.1 to 30 parts per 100 parts of water.

5. The process of claim 1 wherein said salt is present in an amount of at least 0.01% based on the weight of said ethylenically unsaturated compounds.

6. The process of claim 1 wherein said compounds are butadiene, styrene and acrylonitrile.

7. The process of claim 1 wherein said compounds are butadiene and styrene.

8. The process of claim 1 wherein said compounds are ethyl acrylate and methyl methacrylate.

9. The polymeric product resulting from the process of claim 1.

10. The polymeric product resulting from the process of claim 2.

11. The polymeric product resulting from the process of claim 3.

12. The polymeric product resulting from the process of claim 4.

13. The polymeric product resulting from the process of claim 5.

References Cited

UNITED STATES PATENTS

| 2,933,467 | 4/1960 | Borunsky | 260—83.7 |
| 2,963,459 | 12/1960 | Nicholson et al. | 260—83.7 |

JOSEPH L. SCHOFER, *Primary Examiner.*

R. S. BENJAMIN, *Assistant Examiner.*